United States Patent [19]
Hutchison

[11] Patent Number: 5,231,749
[45] Date of Patent: Aug. 3, 1993

[54] METHOD OF MAKING A UNIFIED INTERIOR AND EXTERIOR DESIGN VERIFICATION MODEL

[76] Inventor: John H. Hutchison, 29174 Westmont Ct., Farmington Hills, Mich. 48334

[21] Appl. No.: 767,985

[22] Filed: Sep. 30, 1991

[51] Int. Cl.5 ............................................ B29C 33/38
[52] U.S. Cl. .................................... 29/407; 29/425; 33/567; 33/600; 264/40.1; 264/219; 425/DIG. 29; 425/DIG. 30
[58] Field of Search ............... 29/407, 425, 428, 445, 29/557, 558; 33/562, 567, 600; 249/160; 264/40.1, 219; 425/DIG. 29, DIG. 30

[56] References Cited

U.S. PATENT DOCUMENTS

| | | | |
|---|---|---|---|
| 2,274,060 | 2/1942 | Hart | 264/219 |
| 2,351,891 | 7/1944 | Weisbaum | 35/25 |
| 2,366,652 | 1/1945 | Rieger | 46/76 |
| 2,770,072 | 11/1956 | Bast | 46/17 |
| 2,856,695 | 10/1958 | Hochreiter | 33/567 |
| 3,064,365 | 11/1962 | Ganine | 35/26 |
| 3,076,231 | 2/1963 | Vertin | 29/407 X |
| 3,141,053 | 7/1964 | Terry | 425/DIG. 29 |
| 3,459,274 | 8/1969 | MacPhail, Sr. | 181/33 |
| 3,556,886 | 1/1971 | Reusser | 156/265 |
| 3,629,388 | 12/1971 | Wolf et al. | 264/219 |
| 3,685,110 | 8/1972 | Randolph, Jr. | 29/25.35 |
| 3,788,372 | 1/1974 | Terenzoni | 144/316 |
| 3,840,971 | 10/1974 | McDonald | 29/407 |
| 4,044,414 | 8/1977 | Grycel, III | 29/428 X |
| 4,262,717 | 4/1981 | Kohn | 144/316 |
| 4,277,988 | 7/1981 | Crowe | 29/558 X |
| 4,401,492 | 8/1983 | Koontz, Jr. | 156/182 |
| 4,474,722 | 10/1984 | Martin | 264/219 |
| 4,555,836 | 12/1985 | Martin | 29/428 |
| 4,863,663 | 9/1989 | Nico, Jr. et al. | 264/130 |
| 4,867,922 | 9/1989 | Zuccato | 264/40.1 |
| 4,946,552 | 8/1990 | Onnie | 156/250 |

*Primary Examiner*—Joseph M. Gorski
*Attorney, Agent, or Firm*—Brooks & Kushman

[57] ABSTRACT

A method of making design models allowing for CAD data verification of interior and exterior styled surfaces comprising the following steps. Initially, the interior and exterior surfaces of the proposed design are mathematically modeled. A series of separable parts of said design are defined. At least one bench mark plane is provided within the interior and exterior surfaces of a first part of the design. An exterior surface is shaped on an exterior portion of the first part of the design. Likewise, an interior surface is shaped on an interior portion of the first part of the design. The interior portion and the exterior portion are separated from each other at the bench mark plane when the interior portion is formed. The interior portion and exterior portion are assembled together at the bench mark plane. Finally, the separable parts or modules are assembled together at the boundaries. The method further allows for the disassembly of particular modules and their modification in holding fixtures. The holding fixtures allow for the location of alternative surfaces of the module part relative to the coordinate system and for accurate scanning or measuring any modified surfaces and further verification of CAD surface data to ensure design intent is maintained.

8 Claims, 6 Drawing Sheets

FIG-1 fig-2 fig-3 fig-4 fig-7 fig-8

METHOD OF MAKING A UNIFIED INTERIOR AND EXTERIOR DESIGN VERIFICATION MODEL

TECHNICAL FIELD

The present invention relates generally to making styling models of objects having both interior and exterior styled surfaces such as an automotive vehicle. More specifically, the invention relates to a method of making styling models in modular segments with reference to a spacial coordinate system.

BACKGROUND ART

Automotive and other styling models are used to verify styling concepts. Styling models are made from a wide variety of material including clay, wood and composite materials. Styling models are formed by skilled model makers. A problem with prior art methods of making styling models is the difficulty encountered in making an accurate and verifiable model which allows the modeling of interior and exterior surfaces in a modular manner.

Recently, computer aided design (CAD) has been applied to the styling process to allow visualization of styling models by means of computer graphics. With a CAD system a visual representation of a product or vehicle can be created, modified, rotated and manipulated. The problem with CAD images is that they are not as realistic as an actual model and it is not possible to sit in or walk around a CAD representation.

Design models can be traced to provide an input for a CAD system. An example, of this approach is disclosed in Zuccato U.S. Pat. No. 4,867,922. According to the Zuccato method of making a styling model, a mold is made and fiberglass material is applied to the internal surfaces of the mold. An epoxy-based material is then applied to the fiberglass, hardened and machined to define exterior visible surfaces. The mold is initially milled using the stored data obtained by tracing clay models of interior and exterior surfaces. The Zuccato process is a "one-off" process which cannot benefit from repeatability for sample parts. There is no provision for scanning changes and re-milling. The machined mold is destroyed in order to remove the fabricated part. There is no provision for the use of a soft medium such as clay as part of the finished model. According to this method, the definition of an interior surface is either symmetrically created, based upon the exterior surface or supplied by scanning or CAD sequence. No mechanism is disclosed for locating a component accurately, such as the door disclosed in Zuccato, in an overall styling model in a modular approach.

Another method for making styling models for exterior vehicle design is disclosed in U.S. Pat. Nos. 4,474,722 and 4,555,836 both issued to Martin. According to the method described in the Martin patents, hard surface non-modular styling models are made from styrofoam blocks which are shaped from templates and have their surface replaced with an epoxy resin in a two-step process. The method proposed by Martin is directed to exterior surface modeling and does not provide a verifiable interior and exterior method of modeling. The Martin process is likewise a "one-off" process lacking repetitive advantages and re-scanning capability to modify according to design changes.

In another approach to making models proposed by Nico, Jr. et al in U.S. Pat. No. 4,863,663, cardboard templates are made from cross-sectional drawings of a part taken at spaced intervals corresponding to drawing section lines to form a skeletal frame. Sheet material is bonded to the skeletal frame and then covered with a glass fiber layer and resin. Again, a verifiable method of modeling separable interior and exterior surfaces is not disclosed in the Nico method.

One of the problems encountered in making and using design models is the need to provide a model which may be modified in coordination with adjoining parts. Models must be able to be modified to reflect the changes in secondary surfaces, inner skin or outer skin surfaces, addition or deletion of features or components. Secondary surfaces correspond to boundaries of vehicle parts such as the sides of doors.

Frequently, designers are called upon to develop styling models wherein style changes must be made for different models. For example, in the automotive styling process, related models made on common body platforms are modified by providing different feature elements. For example, a door provided on one style of vehicle can be modified by changing the arm rest and handle assembly or storage compartment features to create a different style of the vehicle. According to prior art techniques, the entire inner door panel and armature would need to be modeled again to allow for actual evaluation of the alternate style.

With prior art styling methods large monolithic fixtures are required to hold parts in their proper orientation. In particular, roof and window frame elements are generally supported by large armatures which interfere with the visualization of the upper passenger compartment. The styling of automotive windows in conjunction with styling models is not easily accomplished when such armatures are used because it is not normally possible to see through window areas when the armatures are in place.

These and other long-standing problems addressed by this invention are solved by a unique, unified approach which is summarized below.

SUMMARY OF THE INVENTION

The present invention relates to the method of making an interior and exterior design verification model according to the following steps. Initially, the interior and exterior surfaces of the proposed design are mathematically modeled. A series of separable parts of said design are defined. At least one bench mark plane is provided within the interior and exterior surfaces of a first part of the design. An exterior surface is shaped on an exterior portion of the first part of the design. Likewise, an interior surface is shaped on an interior portion of the first part of the design. The interior portion and the exterior portion are separated from each other at the bench mark plane when the interior portion is formed. The interior portion and exterior portion are assembled together at the bench mark plane. Finally, the separable parts are assembled together at their boundaries.

The method further comprises the incorporation of rigid plates in each of the interior portion and exterior portion with a planar side of each plate lying in the bench mark plane when assembled. The rigid plate may be formed of metal, carbon fiber honeycomb composite or other rigid dimensionally stable members. The rigid plates preferably include means for securing the interior and exterior portions to a forming machine and subsequently to each other. The rigid plates may be secured to each other by locating pins and corresponding holes for receiving the locating pins. Alternatively, the plates may be secured to each other by gravity co-operating magnetically attracted parts.

The step of mathematically modeling the interior and exterior surfaces of the design may be performed by generating a computer aided design of the proposed design. Alternatively, the step of mathematically modeling the interior and exterior surfaces may be performed by tracing a styling model surface of the design previously created.

The method may also include the step of shaping the interior portion into two or more parts. A primary interior model may be separately formed from a style change interior module. According to the invention, both the primary interior styling module and style change interior module are assembled together to form the bench mark plane of the interior portion.

According to another aspect of the present invention, a method of making a styling model is proposed. According to the method, a three dimensional coordinate system is defined for a styling model and a plurality of boundary surfaces between a plurality of modular parts is defined within the coordinate system. The next step relates to the formation of each of the modular parts in an associated holding fixture having means for locating primary surfaces of the modular parts relative to the coordinate system to allow the surface to be shaped remote from the other modular parts. The modular parts are assembled and secured together to form an assembly by abutting the boundary surfaces of adjacent parts and aligning the primary surfaces in the coordinate system. The assembly is then checked and, if necessary, modular parts disassembled in whole or in part from the assembly. The parts after disassembly may then be placed in their associated holding fixtures and modified while maintaining accurate reference to the coordinate system by means of the known location of the primary surfaces of the modular parts. The parts may then be assembled and secured together to form a modified assembly.

The method of making a styling model may further comprise the step of milling an outer surface of a mold in a fixture, filling the outer surface of the mold with a compound which sets to form an outer surface on the modular part and shaping the inner surface on the modular part by removing material from said modular part.

The method of making a styling model may also include the concept of providing a bench mark plane in each of an interior and exterior portion of the modular part. First and second rigid plates include planar sides lying in the bench mark plane when assembled. The first and second rigid plates preferably include means for securing the interior and exterior portions together such as locating pins and/or magnetically attracted fasteners.

The method also relates to the formation of alternative modular parts and an alternative associated holding fixture with means for locating surfaces of the alternative modular parts relative to the coordinate system. The alternative modular parts may be shaped in alternative associated holding fixtures remote from other modular parts and may be subsequently secured to the other modular parts to form a modified assembly.

According to another aspect of the invention, the boundary surfaces between a plurality of modular parts may be modified to reflect changes in secondary surfaces between the modular parts to accommodate the styling changes of such secondary surfaces.

It is an object of the invention to provide a method of making an interior and exterior design verification model using a modular approach.

It is another object of the invention to fully utilize mathematically modeled representations of interior and exterior surfaces and to define boundaries of separable parts and bench mark planes within given parts having interior and exterior surfaces in a coordinate system which allows verification and, if necessary, modification of surfaces.

It is another object to provide a method of forming interior and exterior surfaces of separable interior and exterior portions of a modular part which are joined along a bench mark plane. Rigid plates are preferably utilized to establish the bench mark plane.

It is another object to provide modules which are further divided to allow for style changes by replacing a portion of an interior or exterior portion of the part.

It is an additional object of the invention to provide a method to make styling models wherein fixtures utilized to initially form models may be used to permit modification of the parts. Work on the model is not generally performed on the assembly but is instead usually carried out at a location remote from the assembled model. The modules can be designed to be placed in a fixture or on a bench. Primary surfaces of the parts are developed with reference to known coordinates utilizing fixturing equipment which allows verification of the design configuration.

These and other objects of the present invention will be apparent to one of ordinary skill in the art in the light of the following detailed description of the present invention. It will also be appreciated that the problems which are described above are solved by the simple and efficient method of the present invention.

DETAILED DESCRIPTION

Figure 1:
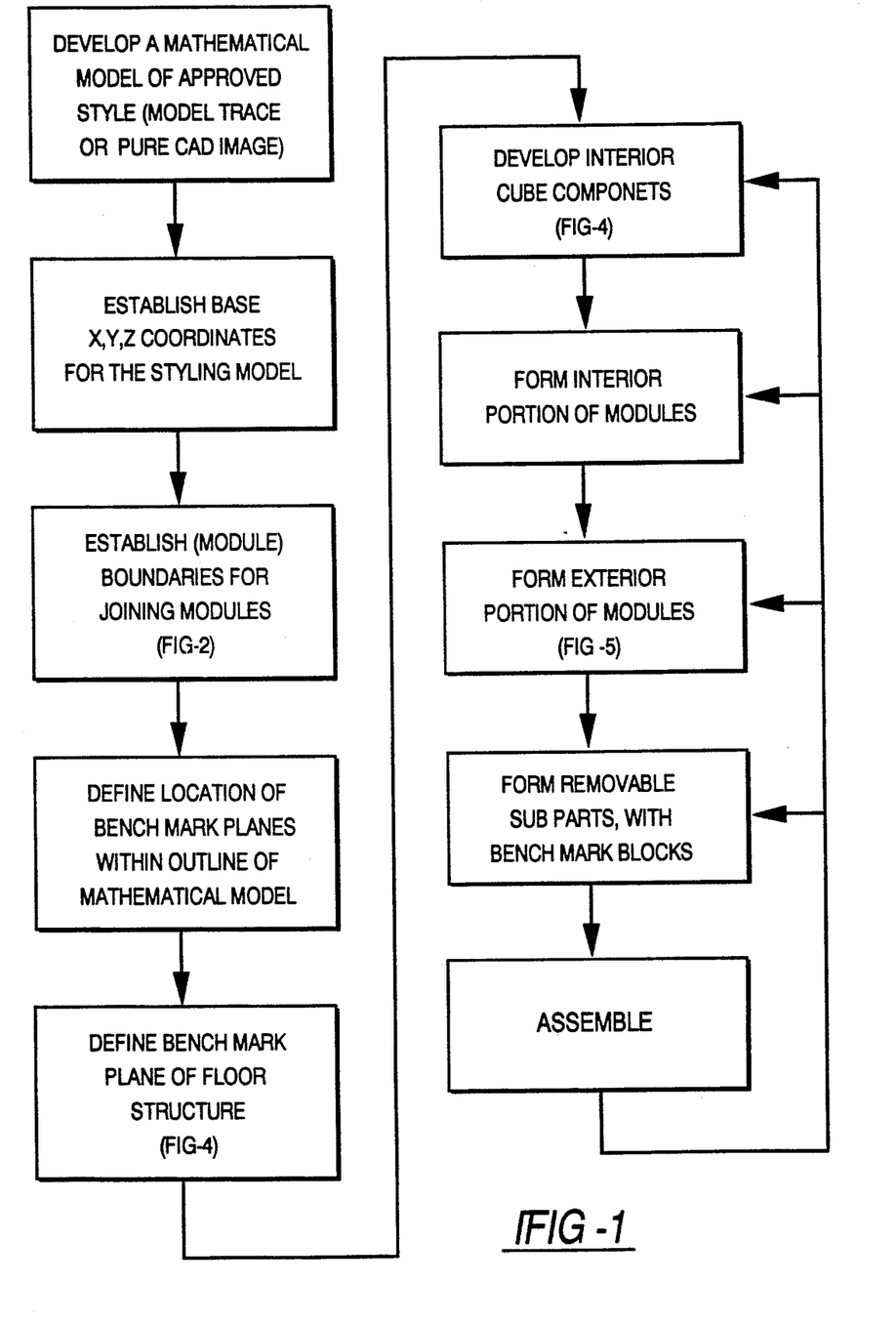
FIG. 1 is a block diagram showing the steps used in performing the disclosed method of making a design verification model.

Referring now to the drawings and in particular to FIG. 1, the steps of the present invention are illustrated. In FIG. 1 a block diagram is presented which outlines briefly the steps of the method with cross-references to figure numbers showing stages in the method. It should be understood that additional steps not shown on FIG.

1 may be added and that steps illustrated in FIG. 1 may be deleted without departing from the invention.

The first step illustrated in FIG. 1 is the step of mathematically modeling the image of an approved style. Mathematical modeling may be developed from tracing a model, tracing a drawing or from a pure computer aided design (CAD) image.

The next step illustrated shows the establishment of the base X-Y-Z coordinates for the styling model. The X-Y-Z coordinates establish a three-dimensional system for locating a reference point.

Figure 2:
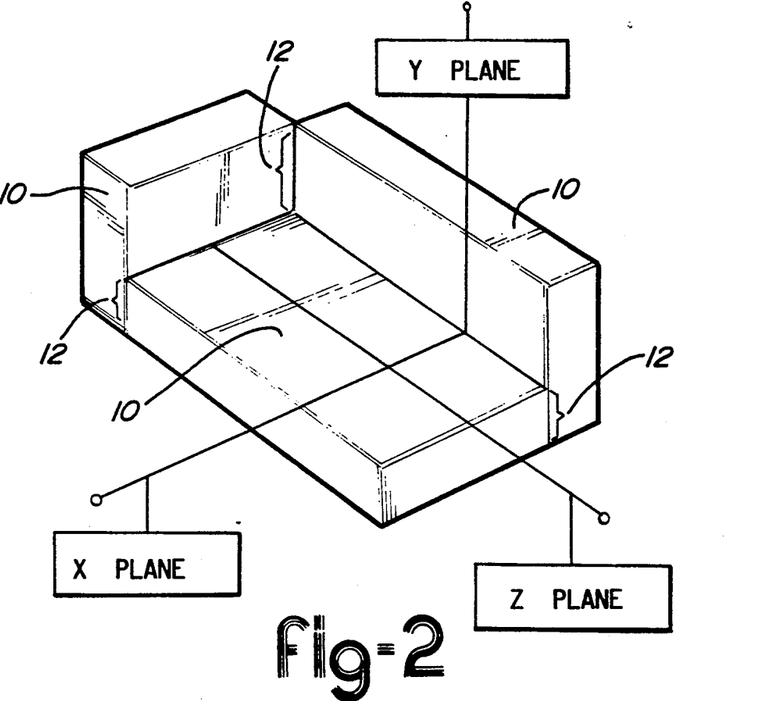
FIG. 2 is a perspective view of modular blocks illustrating coordinate planes.

With reference to FIG. 2, the module boundaries are established for each module of the styling model. The boundaries are established preferably by the CAD system and represent the location at which modules are joined together to form the model. FIG. 2 shows a series of blocks positioned adjacent to one another within an X-Y-Z coordinate system.

Referring now to FIG. 1, the next step in the process is to define the location of bench mark planes within the outline of the mathematically modeled image. Bench mark planes are established within one or more parts having an interior and exterior surface to be styled in a verifiable method. Modules may be divided at their bench mark plane and separately formed. Portions of modules are formed while in fixtures or other holding apparatus which are able to reference precise points located within the X-Y-Z coordinate system.

Figure 4:
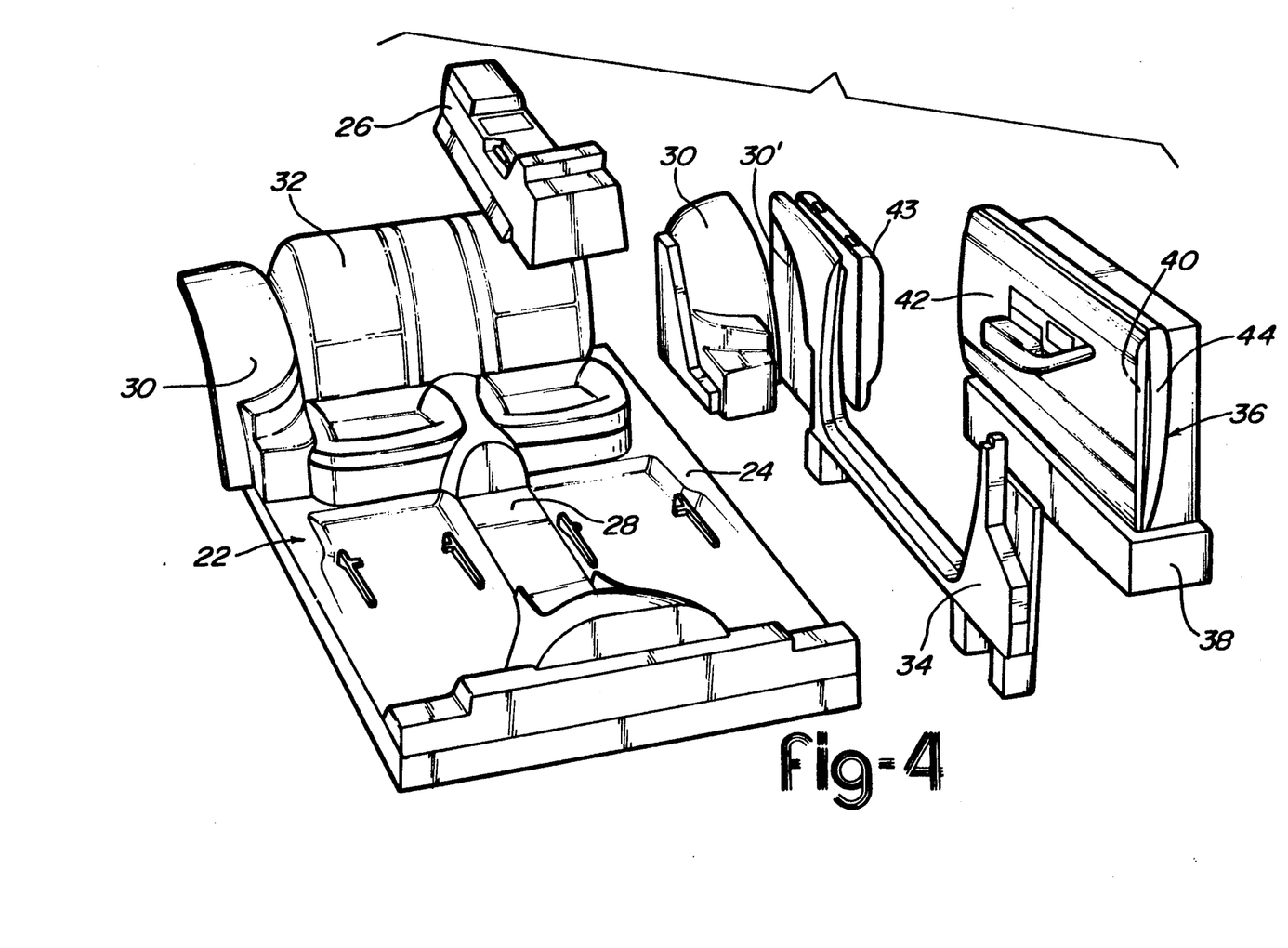
FIG. 4 is an exploded perspective view of a portion of an automotive body interior made in accordance with the invention.

Referring to FIG. 4, the floor structure of the model is shown along with several modules. A bench mark plane is defined on the floor structure and modules are generally positioned in the X-Y-Z coordinate system on the floor module.

Interior cube components such as the center console are fabricated and located with reference to the floor structure in the coordinate system.

Figure 5:
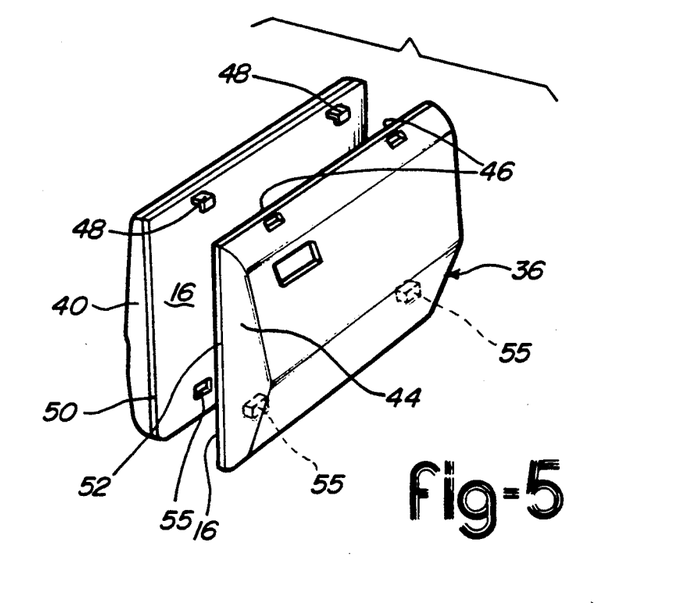
FIG. 5 is an exploded perspective view of a door module.
Figure 7:
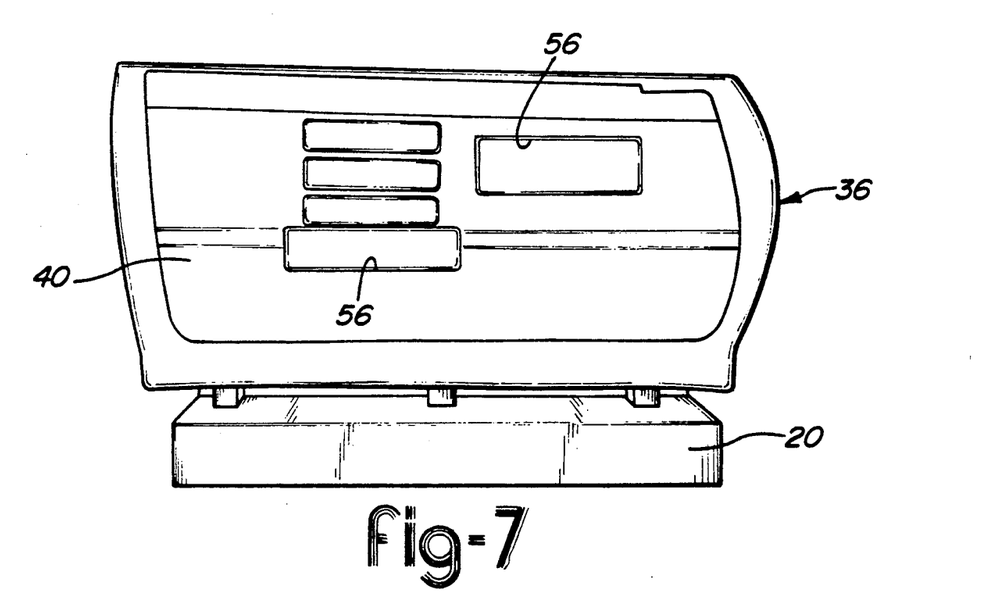
FIG. 7 is an elevation view of a door inner panel made according to the present invention.
Figure 9:
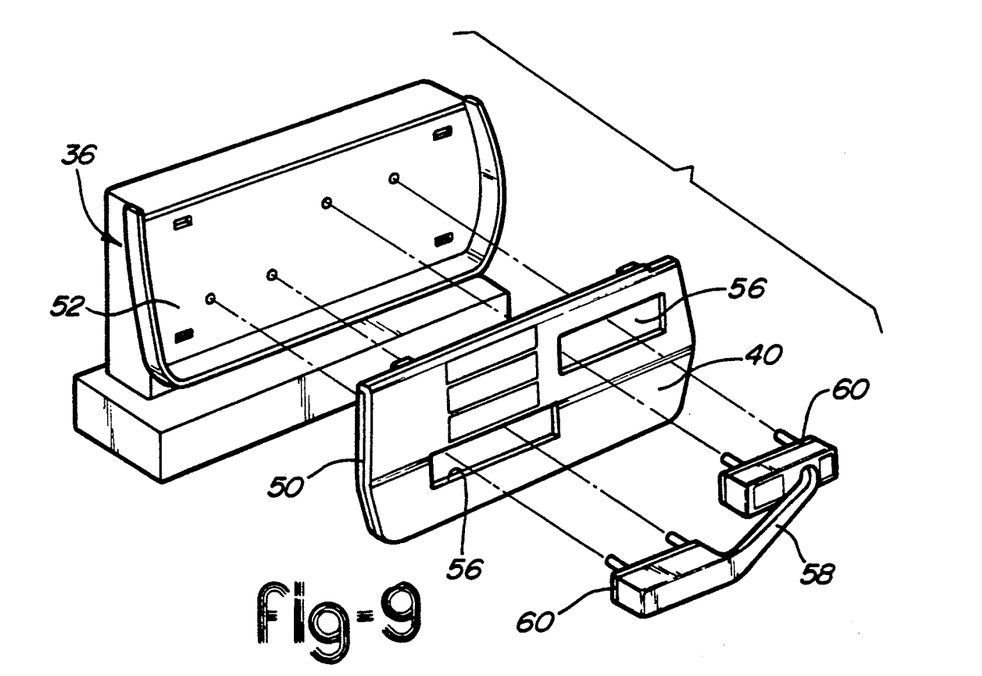
FIG. 9 is an exploded perspective view showing an inner door panel having a style change module made according to the present invention.

The next step is to form the interior portion of one or more modules independently from the exterior portions. The exterior portions are likewise formed independently from the interior portions. In FIG. 5 the interior portions and exterior portions are shown just prior to assembly. Referring to FIGS. 7 and 9, an alternative step of providing removable sub-parts is shown. Each removable sub-part makes up a part of the bench mark plane, and when assembled together, forms the bench mark plane of the interior or exterior portion.

Referring now to FIG. 1, in the next step, the parts are assembled. After assembly, interior cube components, interior portions, exterior portions or removable sub-parts may be disassembled and reassembled until a final styling model with all modifications is completed.

Referring to FIG. 2, the blocks depict cube-like elements assembled in an X-Y-Z coordinate system. The shaping of the individual modules is accomplished in fixtures having the ability to identify the particular spacial location of a given surface shape relative to the X-Y-Z coordinates.

Figure 3:
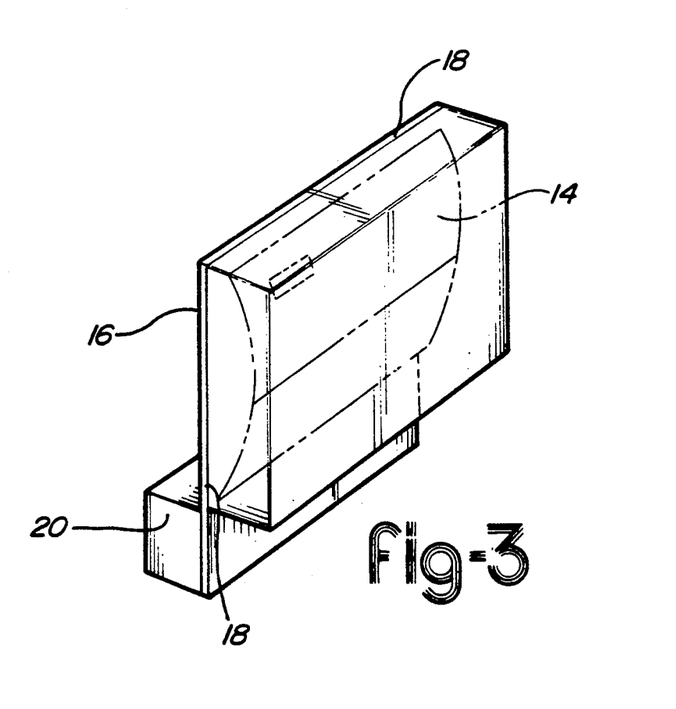
FIG. 3 is a perspective view of a modular component and base.

Referring to FIG. 3, a single module is shown substantially as it would appear prior to formation. In the module shown, the exterior surface 14 of a door is shown. A bench mark plane is indicated by reference numeral 16 and is one side of a plate 18. Plate 18 extends downwardly towards a base 20.

Referring to FIG. 4, a partial styling model is shown in an exploded perspective drawing including a compartment floor 22. Compartment floor 22 includes a supporting surface 24 which is an established plane within the coordinate system. An interior cube component, generally indicated by reference numeral 26, is adapted to be placed on the supporting surface 24.

The illustrated interior cube components 26 in FIG. 4 is a console. Another interior cube component 26 is the wheel housing module 30. Seats 32 are shown on the compartment floor 22 in their desired location using bench mark planes having known coordinates under and behind the seats. A J-line panel 34 for a door is illustrated in a position adjacent to its installed position beside the compartment floor 22. A door module 36 in a door fixture 38 is shown separated from the J-line panel 34 within which it is intended to be installed. The door 36 includes an inner portion 40 on which the inner surface 42 is formed and an exterior portion 44 is shown in the door fixture 38. An exterior portion 43 of the rear exterior quarter panel is also illustrated adjacent its associated wheel housing module 30. The bench mark plate 30' of the wheel housing module 30 which may be an extension of the J-line panel 34 is shown.

Referring to FIG. 5, inner and outer portions 40 and 44 of a door are shown prior to assembly. L-brackets 48 extend from the interior portion 40. The L-brackets 48 are received in receptacles 46 formed on the inner portion 44 and held in place by gravity. When the L-brackets 46 are fully received in the receptacles 48, the inner panel plate 50 and outer panel plate 52 are aligned with the bench mark plane 16 of the door 36. The L-brackets 48 can be used in conjunction with magnets 53 to secure the plates together.

Figure 6:
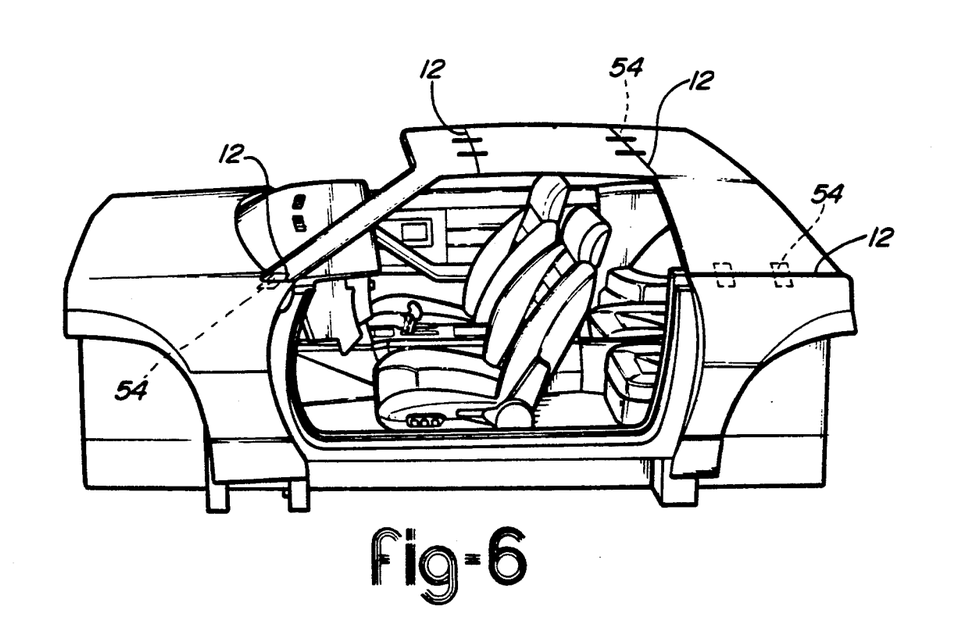
FIG. 6 is a perspective view of a car body made according to the present invention with the door module removed.

As shown in FIG. 6, other modules are secured together by means of fasteners 54, such as locating pins in combination with joint clips, magnets 55 or otherwise. The fasteners 54 provide a mechanism for securing together adjacent modules at a particular point. The modules are then joined at the boundaries 12 to form the complete assembly.

Magnetic locating elements 55 and 55' can be permanent magnets or may be electric magnets. If permanent magnets are used, the magnetic force must be limited to allow for disassembly. With electric magnets, the holding force can be increased by application of electrical current and decreased for removal by turning the power off. Other attachment techniques include the use of a cam lock dowel pin where the dowel pin may be turned to lock it into a cam receiving receptacle. Examples of cam locks and cam receiving receptacles are used in modular furniture applications. It will be readily appreciated that other common fasteners such as screws or locating pins could be used in the assembly process.

Referring to FIG. 7, an inner portion 40 of a door 36 is shown supported by a base 20. The inner door portion includes style part openings 56 which are adapted to receive a second portion of the inner portion of the door 40. For example in FIG. 9, an arm rest 58 forms the second part of the inner door panel and is separated from the remainder of the inner door panel. The arm rest is received within the openings 56 and include supplemental inner plates 60 which are aligned with inner panel plate 50 to complete the inner portion 40 of the door 36.

Figure 8:
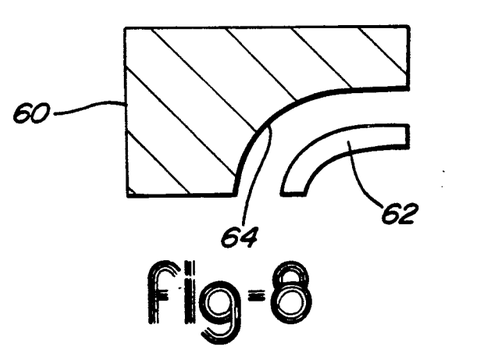
FIG. 8 is a fragmentary cross-sectional view showing a mold fixture and part formed thereby.

Referring to FIG. 8, an outer surface mold 62 is shown in fragmentary cross-section with a part 64. The method comprehends the formation of an outer surface mold 62 by milling or otherwise shaping the outer surface mold cavity 66 in the mold 62. Part 64 can be partially formed in the mold by placing a malleable material in the mold cavity 66 to form the outer surface of the part 64. The inner surface 68 of the part 64 can be milled or otherwise shaped preferably by a computer-controlled milling machine so that an accurate inner surface can be formed on the part 64. The mold 62 is located in relation to the coordinate axis system so that the part 64 may be replaced in the mold 62 and modifications may be made to allow the part 64 to be shaped with reference to the coordinate axis system.

Various techniques for filling mold cavities are known in the art including placing a vacuum bag in the cavity. The vacuum bag is filled with fiberglass and a resin and evacuated to form a hard filler for large sections of the mold cavity. Alternatively, resin may be used with various filler material or composite reinforcements to fill the mold.

The material used for making the design model may include one or more types of material. These should be selected according to the program stage, and the size and shape requirement of the part. Material suitable for use as design model modules include clay, REN, wood, composite modeling compounds, high density foam and fiberglass.

The preceding description is intended to illustrate a preferred embodiment of the invention and should not be read in a limiting sense. The scope of the invention should be measured with reference to the following claims and is intended to encompass equivalent methods that will be readily apparent to those of ordinary skill in the art.

I claim:

1. A method of making an interior and exterior design verification model comprising:

developing a mathematical model of an interior surface and an exterior surface of a proposed design;

defining a series of boundaries of separable parts of said design;

defining at least one bench mark plane within a space bounded by an interior surface and exterior surface of a first part of said design, said first part having an interior portion and an exterior portion associated therewith, the interior surface and exterior surface of said first part corresponding to the interior and exterior surfaces of said proposed design, respectively, when the interior and exterior portions of the first part are joined together;

assembling the interior and exterior portions to each other thereby aligning the portions and thereby forming an assembly;

checking the assembly;

separating the interior and exterior portions from each other at said bench mark plane then;

shaping said exterior surface on the exterior portion of said first part of said design according to the mathematical model independently from the interior portion;

shaping said interior surface on the interior portion of said first part of said design according to the mathematical model independently from the exterior portion; and re-assembling said interior portion and said exterior portion together at said bench mark plane.

2. The method of claim 1 wherein said step of providing at least one bench mark plane further comprises the step of incorporating a first rigid plate in said exterior portion and a second rigid plate in said interior portion, said rigid plates each having a plane side lying in said bench mark plane when assembled, the rigid plates including means for removably securing said interior and exterior portions to each other, the rigid plates allowing the interior and exterior surfaces to be independently shaped.

3. The method of claim 1 wherein the step of assembling the interior and exterior portions to each other comprises the step of inserting locating pins, formed on one of the interior and exterior portions, into holes, formed within the other of the interior and exterior portions, and wherein the step of separating the interior and exterior portions from each other comprises the step of withdrawing the locating pins from the holes.

4. The method of claim 1 wherein said step of developing a mathematical model of interior and exterior surfaces of the proposed design comprises generating a computer aided design of said proposed design.

5. The method of claim 1 wherein said step of developing a mathematical model of interior and exterior surfaces of a proposed design comprises tracing a styling model surface to generate a mathematical representation of said proposed design.

6. The method of claim 1 wherein said step of shaping said interior surface on the interior portion of said first part of said design, comprises forming a primary interior module having a surface which represents a first portion of said interior surface and a style change interior module having a surface which represents a second portion of said interior surface, said primary interior module being separately formed from said style change interior module, and wherein both of said primary and style change interior modules are assembled together to form said bench mark plane the first portion and second portion representing said interior surface.

7. The method of claim 1 further comprising the step of forming bench mark planes on a supporting surface corresponding to a floor structure of an interior space of the model, as defined by the interior surfaces of the separable parts.

8. The method of claim 1 wherein said step of re-assembling said interior portion and said exterior portion together further comprises placing magnetically attracted parts on said interior and exterior portions to hold them together.

* * * * *